United States Patent [19]
Edelson

[11] Patent Number: 5,464,464
[45] Date of Patent: Nov. 7, 1995

[54] METHOD FOR REDUCING PARTICULATE IRON ORE TO MOLTEN IRON WITH HYDROGEN AS REDUCTANT

[75] Inventor: Jonathan Edelson, Princeton, N.J.

[73] Assignee: Borealis Technical Incorporated Limited, Israel

[21] Appl. No.: 258,572

[22] Filed: Jun. 10, 1994

[51] Int. Cl.$^6$ ..................................................... C22D 7/00
[52] U.S. Cl. .............................. 75/310; 75/443; 75/958
[58] Field of Search ........................... 75/10.37, 10.43, 75/10.42, 10.48, 443, 958, 310

[56] References Cited

U.S. PATENT DOCUMENTS

| | | | |
|---|---|---|---|
| 2,066,665 | 1/1937 | Baily | 75/10.57 |
| 2,249,410 | 7/1941 | Wilson | 75/452 |
| 2,287,663 | 6/1942 | Brassert | 75/10.67 |
| 2,503,555 | 4/1950 | Lykken | 75/443 |
| 2,862,808 | 12/1958 | Jahn | 75/34 |
| 2,951,756 | 9/1960 | Cavanagh | 75/40 |
| 3,053,648 | 9/1962 | Stephens | 75/444 |
| 3,140,168 | 7/1964 | Halley | 75/10.43 |
| 3,615,351 | 10/1971 | Happel | 75/38 |
| 3,862,834 | 1/1975 | Waclawiczek | 75/11 |
| 4,072,504 | 2/1978 | Perdahl | 75/40 |
| 4,160,663 | 7/1979 | Hsieh | 75/35 |
| 4,224,056 | 9/1980 | Tomizawa | 75/11 |
| 4,318,736 | 3/1982 | Driemeyer | 75/38 |
| 4,421,553 | 12/1983 | Ponghis | 75/41 |
| 4,978,106 | 12/1990 | Kelmar | 266/177 |

OTHER PUBLICATIONS

Gretz; Korf; Lyons, Hydrogen in the Steel Industry, 1991, Jun., pp. 691–693.

*Primary Examiner*—Peter D. Rosenberg

[57] ABSTRACT

A method for reducing particulate iron oxide and/or other iron units to molten iron utilizing gaseous hydrogen as reductant in a reducing furnace, in which the ore freely falls during the melting and reduction process. Reacted top gas is purified and recirculated through the reduction furnace, establishing a counter-flow relationship to the particulate iron oxide, thereby heating and reducing the oxide. The heat for reduction is generated by combusting a fraction of the hydrogen reductant with oxygen. Heat may also be supplied via the use of electric arc heating. Oxygen may be partially or wholly replaced with water in order to maintain reaction oxidizer ratios while reducing heat supplied to the reaction.

12 Claims, 1 Drawing Sheet

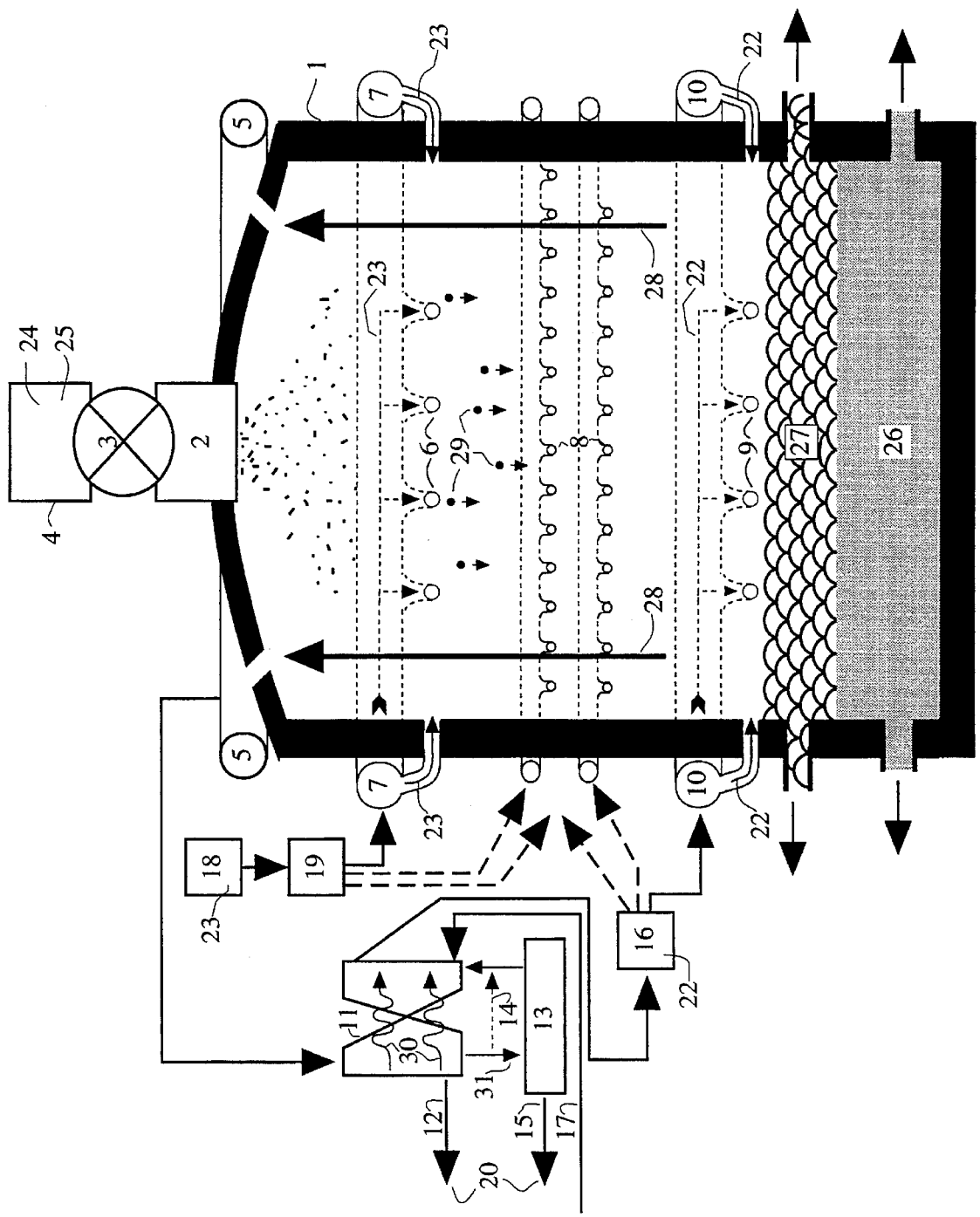

METHOD FOR REDUCING PARTICULATE IRON ORE TO MOLTEN IRON WITH HYDROGEN AS REDUCTANT

BACKGROUND—CROSS-REFERENCE TO RELATED APPLICATIONS

This invention may be used as the reduction process identified in my patent application soon to be filed under the title "Method for the Production of Steel."

BACKGROUND—FIELD OF INVENTION

The present method relates to the smelting reduction of iron ore.

BACKGROUND OF THE INVENTION

Conventional blast furnace operation involves a counter flow of ore and/or other iron units (hereafter referred to simply as ore) and reducing gas in a furnace. The ore is fed as particles which may be lump ore, sinter feed, pellets, briquettes, or other agglomerates. In such a blast furnace, the ore descends as a burden in which individual particles of ore rest atop other particles forming a porous mass. The reducing gas rises through channels in the burden, and exits at the top of the furnace.

The use of ore burdens introduces several difficulties related to the mass of the burden. First, the walls of the furnace must be able to support the mass of the burden. Second, the ore must be able to support itself in order to provide for gas flow (as will be described below). Finally, the thermal mass of the burden makes initiating or halting furnace operation a lengthy process involving extensive fuel use. In a furnace which melts the burden as it descends, improper shutdown can render the furnace unusable and filled with a solid fused mass of ore, slag, and metal.

The need for gas channels is a major factor in process parameters. The ore must meet strict size and strength requirements which restrict mass fraction present as fines and insure that ore particles do not undergo excessive degradation into fines. Additionally, if the ore melts, a material such as coke is required to maintain gas channels throughout the molten material. The size requirements are problematic because many beneficiation processes are better suited to producing smaller ore particles. If the beneficiated ore particles are too small for the blast furnace, then an agglomeration step is needed to produce suitable larger particles. In the conventional blast furnace, the coke serves both to maintain the gas channels and to supply the reductant gas. Coke is a major cost in blast furnace operations.

Refinements in blast furnace technology have tended to reduce coke consumption. These refinements include the injection of hydrocarbon fuels with the hot blast, and the use of top gas to provide the hot blast. U.S. Pat. No. 4,421,553 to Pongis et al. (1983) demonstrates that one can considerably reduce coke consumption rate through the use of externally generated and heated reducing gas. Pongis et al. were also able to achieve a high level of control over blast furnace operation through the control of the reducing gas temperature, pressure, and composition.

Direct reduction processes eliminate the need for coke in the reduction step. The ore is never melted, and thus the needed gas channels are maintained by the ore itself. Reductant can be totally supplied by external means. Internal reductants, if used, do not need to meet the strength requirements of coke, thus ordinary coal and fuel oils can be used. Natural gas used as a reductant has proven viable in regions where natural gas is plentiful.

The product of the direct-reduction furnace is sponge iron, a high surface area material consisting of metallic iron intermingled with the gangue from the ore. This material needs to be melted to separate the iron from the gangue, generally in a separate step involving an electric arc furnace. The material must be passivated prior to transport, as it is subject to catastrophic oxidation. The product is not suitable as the primary feed for steel conversion processes other than the electric arc furnace. Specifically, direct-reduction does not produce the molten hot metal that is needed by the basic oxygen furnace or by other self powered steel conversion processes. Direct-reduction processes make use of a burden similar to that of blast furnace processes. Ore must meet similar strength, size, and stability requirements to that of the ore used in blast furnace operations. Substandard ore and/or incorrect charging can cause problems with gas flow, burden stability, or agglomeration.

Various processes have been proposed or attempted in order to combine the coke-free direct-reduction process with melting to supply hot metal or pig iron. The most optimistic of these processes claim to produce steel directly. In general these processes combine a direct-reduction process with a melting process, using off gasses and heat from the melting process to supply reductant to the direct-reduction process. An example of this direct-reduction process with melting is U.S. Pat. No. 3,140,168 to Halley et al.(1964). In this process, a fluidized bed pre-reduction zone is coupled to an arc furnace wherein the arc includes a hydrogen jet, the arc providing both the reductant and heat to the reduction process. In U.S. Pat. No. 4,248,408 to Beggs et al. (1981) a method was taught which used electrical heating to provide the necessary heat for the reduction process, as well as oxy-fuel burners for melting of the product. These processes are limited by the fact that ore strength requirements must be met, and are also limited by the increased complexity of combining separate reduction and melting processes.

The closest known prior art to the current invention are the various processes which make use of freely falling ore particles. These processes avoid the problem of having to maintain an acceptable burden (vis. strength, gas flow, etc.) by eliminating the burden. The falling-particle processes allow tier furnace operation above the melting point of the ore. Higher temperatures enable more rapid reduction reactions, as well as molten product. Eliminating the burden also reduces the requirements for ore strength, and makes the use of fine ore particles, such as produced by beneficiation or superconcentration processes, not only permissible, but desirable. Finally, because the melting and reduction phases are coterminous, furnace complexity and cost are greatly reduced.

U.S. Pat. No. 2,066,665 to Baily (1937) is an early example of the freely falling reduction furnace. Baily teaches that particles of ore are caused to descend in an upward flow of reducing gas, which is produced through the partial combustion of fuel in air. The particles of ore are swiftly reduced, and allowed to fall into a pool of molten metal and slag. The reducing gas considered in the aforementioned patent is composed of carbon monoxide, generally mixed with hydrogen. No attempt is made to recycle the reducing gas, which by virtue of reaction equilibrium can only be partially used. While an attempt is made to recover the heat energy entrained in the used reducing gas, much of the available energy is wasted. Additionally, the fuel value of the used reducing gas is used only indirectly by generating electricity fir heating the reaction. Although hydrogen is mentioned for its value as part of the reducing gas, no mention is made of the great benefits to be had through the use of a pure hydrogen reductant.

U.S. Pat. No. 2,951,756 to P. E. Cavanaugh (1960) discloses a Jet Smelting Process, in which ore particles are entrapped in a turbulent reducing flame consisting of natural gas and oxygen. As compared to the work by Baily, higher on temperatures are achieved and more rapid reaction facilitated. However, little or no effort is made to recycle the 'top gas' (atypically drawn off of the bottom of the reaction), and the gas flow is not counter-flow to the ore glow. While this reduction method is extremely simple, it requires excessive natural gas for operation.

Objects and Advantages

Accordingly, besides the objects and advantages of the methods of the smelting of iron ore described in my above patent, several objects and advantages of the present invention are the following:

It is an object of the present invention to provide a method by which iron ore can be reduced to molten metal without the use of coke or carbon based reductants.

An advantage of the present invention is that the use of expensive coke is avoided.

A further advantage of the present invention is that carbon dioxide is not produced as a waste product during the reduction of the iron.

A further advantage of the present invention is that the various pollution problems associated with fossil fuel and coke use are avoided.

A further advantage of the present invention is that the various product contamination problems associated with coal and coke use are avoided.

It is an object of the present invention to provide a reduction method compatible with small ore particle sizes.

An advantage of the present invention is that initial physical separation of the ore from commingled materials is enhanced.

An advantage of the present invention is that friable ores or fines from grinding operations may be used.

An advantage of the present invention is that fines from beneficiation and superconcentration processes may be easily used.

It is an object of the present invention to provide a reduction method which both allows the use of highly beneficiated ores of extreme purity, and which does not introduce impurities in the reduction process.

An advantage of the present invention is that the product will be of extreme purity, and it may be simply converted to a high quality steel, without extensive purification, slagging, or decarburization steps.

It is an object of the present invention to provide a reduction method amenable to rapid startup and shutdown.

An advantage of the present invention is that reduction furnace operations can be adjusted to accommodate variation in economics and fuel supply, at little marginal cost.

It is an object of the present invention to provide for total top gas recycling.

An advantage of the present invention is that there are no top gas emissions, and all of the reduction potential of the top gas is eventually used.

Further objects and advantages of this invention are potentially improved steel quality owing to the higher quality iron produced, the potential for the tapping of steel directly from the reduction furnace without a steel conversion step, the reduction in cost for the production of fine specialty steels, and facilitating the production of esoteric steels not currently used because of production costs. Furthermore, the size of the reduction plant is extremely flexible, allowing large plants which could replace blast furnace operations or small plants for specialty uses. Still further objects and advantages of this invention will become apparent from a consideration of the figure and ensuing descriptions.

DESCRIPTION OF DRAWING

The drawing illustrate an apparatus for carrying out the method of the invention. FIG. 1 is a drawing of a preferred embodiment of the invention.

| List of reference numerals | | | |
|---|---|---|---|
| 1 | refractory-lined chamber | 2 | materials inlet |
| 3 | feed control device | 4 | feed hopper |
| 5 | main top gas manifold | 6 | main oxygen jet array |
| 7 | oxygen supply ring | 8 | secondary gas inlet jets |
| 9 | main hydrogen jet array | 10 | main hydrogen supply ring |
| 11 | heat exchanger | 12 | condensate drain |
| 13 | gas scrubbing units | 14 | bypass valve |
| 15 | scrubber condensate drain | 16 | hydrogen gas handling system |
| 17 | hydrogen supply line | 18 | oxygen supply |
| 19 | oxygen gas handling system | 20 | condensate water and impurities |
| 22 | hydrogen | 23 | oxygen |
| 24 | iron ore | 25 | fluxes |
| 26 | molten iron | 27 | molten slag |
| 28 | hot gas | 29 | molten iron ore |
| 30 | sensible heat | 31 | impure hydrogen gas |

DESCRIPTION OF INVENTION

Briefly described, the invention comprises melting iron ore using heat from the combustion of hydrogen and oxygen in a reducing flame, the ore being allowed to fall freely through the combustion zone. The now molten ore continues to fall through a reduction zone supplied with hot hydrogen gas. The hydrogen gas rapidly and completely reduces the molten ore to the metallic state. The molten and reduced ore collects at the base of the furnace, either in a hearth suitably fitted for tapping, or in a ladle fitted for removal.

Referring now to the drawing, a refractory-lined chamber 1 comprises the reduction and melting zones. A suitable materials inlet 2 is disposed at and connected to the top of refractory-lined chamber 1, and is provided with a feed control device 3 and a feed hopper 4. All feed components are used in conventional practice, and thus such components are not described in detail. All such components are amenable to standard modifications such as screw feed or controlled atmosphere.

Refractory-lined chamber 1 is provided with several gas inlet jets and exhaust ports, including a main top gas manifold 5, a main oxygen jet array 6 and an oxygen supply ring 7, numerous secondary gas inlet jets 8, and a main hydrogen jet array 9 and a main hydrogen supply ring 10. Main top gas manifold 5 is connected to a heat exchanger 11 equipped with a condensate drain 12. Heat exchanger 11 is further connected to appropriate gas scrubbing units 13 for the removal of impurities in the gas. Scrubbing units are equipped with condensate drains 15. Scrubbing units 13 may include, but are not limited to, water, lime, etc. Potentially, scrubbing units 13 will not be necessary depending upon ore quality, therefore scrubbing units 13 may be eliminated or equipped with a bypass line 14, in the conventional manner.

Scrubbing units 13 are connected to heat exchanger 11, and heat exchanger 11 is connected to a hydrogen supply line 17. The output of heat exchanger 11 is further connected by means of a suitable hydrogen gas handling system 16, consisting of pipes, suitable compressors, and suitable valves, to main hydrogen supply ring 10. Gas handling system 16 may also be connected to secondary gas inlet jets 8. Hydrogen supply ring 10 is further connected to main hydrogen jet array 9, thus timing a closed process gas cycle.

An oxygen supply 18 is connected by means of a suitable oxygen gas handling system 19, consisting of pipes, suitable compressors, and suitable valves, to a main oxygen supply ring 7. Gas handling system 19 may also be connected to secondary gas inlet jets 8. Oxygen supply ring 7 is connected to a main oxygen jet array 6, forming the oxygen control and inlet system.

In operation, the inputs to the process are hydrogen 22, oxygen 23, iron ore 24, and fluxes 25. The outputs are molten iron 26, molten slag 27, condensate water 20, and various impurities trapped in condensate water 20 and/or by scrubbing units 13. The process is essentially continuous, with ore 24 being fed at the top, and molten iron 26 and molten slag 27 being tapped from the base, with continuous circulation and replenishment of reductant hydrogen 22.

To fully describe the process, it is essential to examine the solids flow and the gas flow separately. The following presumes that the reactor has reached steady state operation.

Iron ore 24 enters the furnace through the materials inlet 2, at a rate determined by control device 3. Iron ore 24 encounters rising hot gas 28, and iron ore 24 is heated thereby. Gas 28 is maintained to be slightly reducing, preventing the oxidation of magnetite ores.

Shortly after being led through materials inlet 2, iron ore 24 reaches the level of the main oxygen jet array 6. Oxygen 23 blown through main oxygen jet array 6 combusts with hydrogen 22 contained in hot gas 28, producing water and heat. The heat raises the temperature of iron ore 24, and causes iron ore 24 to melt. Oxygen flow rates determine the quantity of heat generated, and thus the temperature of the molten iron ore 29; the temperature of molten iron ore 29 is selected to be in the range of 1600 degrees C. and 2000 degrees C., or above, and appropriate quantities of oxygen 23 are injected to maintain the desired temperature. Molten iron ore 29 descends through hot gas 28. Hydrogen 22 in hot gas 28 rapidly and completely reduces molten iron ore 29 to molten iron 26. Molten iron 26 is collected at the base of refractory-lined chamber 1.

The main gas cycle is as follows:

Hydrogen 22 heated by heat exchanger 11 is fed via hydrogen gas handling system 16, main hydrogen supply ring 10, and main hydrogen jet array 9 into refractory-lined chamber 1. Hydrogen 22 flows upward as hot gas 28 and reduces molten iron ore 29, producing molten iron 26. A byproduct of the reduction step is water vapor, which becomes part of hot gas 28. As the percentage of water vapor in hot gas 28 increases, the reducing potential of hot gas 28 decreases. Hydrogen 22 gas flow must therefore be adjusted so as to be between 1.5 and 5 times greater than the hydrogen gas requirements for the reaction. As hot gas 28 reaches the level of main oxygen jet array 6, it reacts with injected oxygen 23, providing heat for the initial melting of iron ore 24. Hot gas 28, now contains up to 70% water vapor. Hot gas 28 continues to flow upward, and exits refractory-lined chamber 1 through top gas manifold 5.

Hot gas 28 composition in top gas manifold 5 consists of hydrogen, water vapor, and potentially sulfur, carbon, and other compounds found as impurities in iron ore 24. Hot gas 28 will also be carrying considerable sensible heat. Hot gas 28 is carried to heat exchanger 11, where the sensible heat is transferred to hydrogen 22. As hot gas 28 cools, the contained water vapor condenses out, leaving impure hydrogen gas 31. Impure hydrogen gas 31 is then purified in scrubbing units 13 to remove any impurities, and combined with fresh hydrogen via hydrogen supply line 17, producing hydrogen 22 for the reduction process.

Hydrogen 22 is fed back through heat exchanger 11, where it is heated. Hot hydrogen 22 is then fed by hydrogen gas handling system 16 to main hydrogen supply ring 10, and again through refractory-lined chamber 1, closing the gas loop.

Oxygen 23 may be injected through secondary gas inlet jets 8 in order to maintain the temperature of the reaction. Hydrogen 22 may also be injected through secondary gas inlet jets 8 in order to control reaction parameters. Such additional heating may not be necessary, and secondary gas inlet jets 8, as well as the associated piping, may be eliminated.

Summary, Ramifications, and Scope

This invention is a method for reducing particulate iron oxide to molten iron with hydrogen reductant. While the above description contains many specificities, these should not be construed as limitations on the scope of the invention, but rather as an exemplification of one preferred embodiment thereof. Many other variations are possible. For example, the process need not be operated in a continuous fashion, perhaps with particles suspended in a microgravity environment. Another variation is that the ore particles could be carried into the reduction zone using a jet flame, rather than allowing the ore particles for fall through a flame zone. Another variation is that the particles could be moved through the various reaction zones by means of some type of support, at any angle of inclination, perhaps in a horizontal furnace or rotating hearth furnace. Yet another mode of operation would place electrodes at the level of the oxygen jets in order to provide heat for melting through the use of an electric arc. Accordingly, the scope of the invention should be determined not by the embodiment illustrated, but by the appended claims and their legal equivalents.

I claim:

1. A method of reducing particulate iron ore to molten metal comprising the steps of
   (a) introducing said ore into a refractory lined furnace means along with fluxing means for the production of slag;
   (b) passing said ore particles through a flame generated by combusting oxygen with excess hydrogen, so as to fully melt the ore particles;
   (c) regulating the rate of said introduction of said ore particles so that the said ore particles are able to freely fall through said furnace means;
   (d) introducing hydrogen into said furnace means through inlet means and causing said hydrogen gas to flow upwardly through said furnace means, in counterflow to said molten ore particles;

(e) introducing oxygen into said furnace means through inlet means for combustion with said hydrogen;

(f) removing hot gaseous by-products from said furnace means; and (g) collecting said molten particles in then reduced state.

2. A method as in claim 1 wherein said particulate iron ore is understood to be any material consisting of iron in chemical combination with one or more additional chemical elements.

3. A method as in claim 1 additionally comprising:

(h) purifying said hot gaseous by-products from said furnace means, said purified gaseous by-products being essentially pure hydrogen; and (i) returning said purified gaseous by-products to said furnace means along with said hydrogen gas.

4. A method as in claim 1 additionally comprising:

(j) preheating said hydrogen gas.

5. A method as in claim 1 additionally comprising:

(j) passing said hot gaseous by-products from said furnace means through heat exchanger means for the recovery of heat from said hot gaseous by-products; and (k) passing said hydrogen gas through said heat exchanger means for preheating said hydrogen gas.

6. A method as in claim 1 additionally comprising:

(l) preheating said oxygen.

7. A method as in claim 1 additionally comprising:

(m) passing said hot gaseous by-products from said furnace means through heat exchanger means for the recovery of heat from said hot gaseous by-products; and (n) passing said oxygen gas through said heat exchanger means for preheating said oxygen gas.

8. A method of reducing particulate iron ore to molten metal comprising the steps of:

(a) passing said ore particles along with flux means for the production of slag through a flame, thereby fully melting said ore particles and said flux means;

(b) passing said molten ore particles and said molten fluxing means through a countercurrent flow of hydrogen gas, thereby substantially reducing said molten ore particles to molten metal;

(c) introducing oxygen gas into said hydrogen gas flow, combusting a fraction of said hydrogen gas with said oxygen, thereby producing said flame; and (d) collecting said molten metal particles and said molten flux means.

9. A method as in claim 8 wherein the aforementioned steps take place in a refractory lined furnace means.

10. A method as in claim 8 additionally comprising:

(e) collecting by-product gasses produced by the reduction of said ore and the combustion of said hydrogen;

(f) purifying said by-product gasses, leaving essentially pure hydrogen; and (g) using said purified by-product gasses as a source of hydrogen for the present process.

11. A method as in claim 8 additionally comprising (e) collecting by-product gasses produced by the reduction of said ore and the combustion of said hydrogen;

(f) passing said by-product gasses through heat exchanger means for the recovery of heat from said by-product gasses; and (g) passing said hydrogen and said oxygen through said heat exchanger means for the preheating of said hydrogen and said oxygen.

12. A method as in claim 8 wherein said flame is understood to be a region of hot ionized gas.

* * * * *